2,822,179

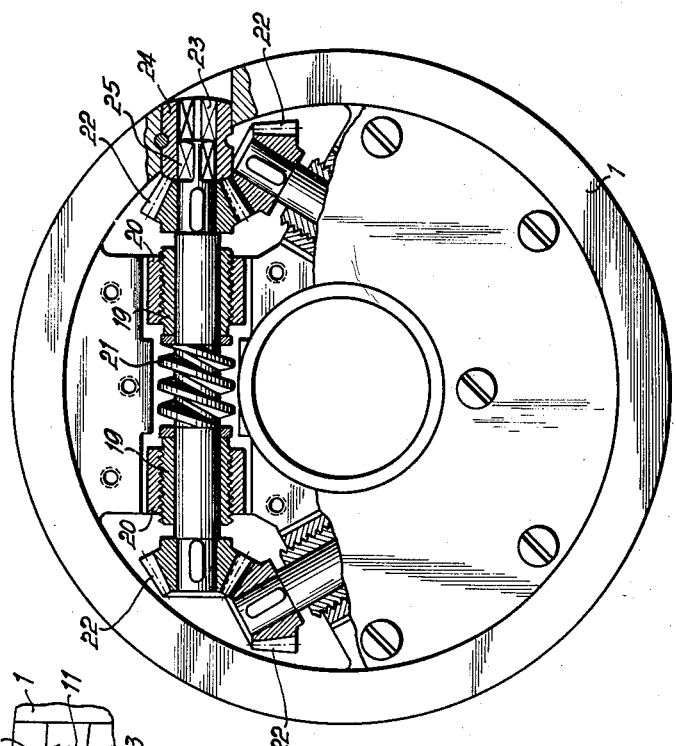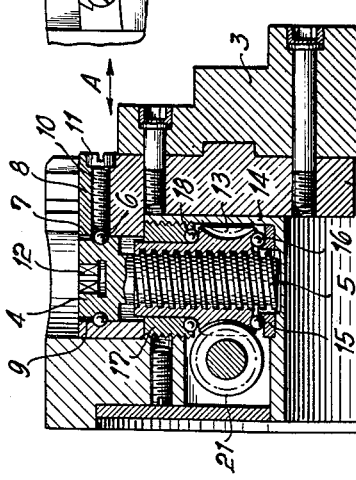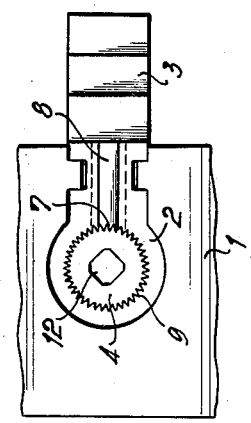

CHUCKS WITH JOINTLY AND SEVERALLY ADJUSTABLE JAWS

Paul Bärwinkel, Dusseldorf-Unterrath, Germany

Application April 20, 1956, Serial No. 579,490

5 Claims. (Cl. 279—112)

The invention relates to a chuck the jaws of which are adjustable by means of screw spindles both jointly and also—after disengaging a device effecting the joint adjustment—severally by turning the spindles.

In the known chucks of this type, the chuck body is provided with rotatable but not adjustable and therefore not shiftable spindles on which the jaws move radially. An axially shiftable clutch cone is arranged on the heads of the spindles and engages in a hollow conical hub of a pinion coaxial with the spindle, which pinion meshes with a toothed rim in the chuck housing. In the chuck body, which is rigidly connected with the clutch cone, a screw plug is arranged coaxial with the spindle extending freely therethrough and serves for shifting the clutch cone. When the clutch cones of all the spindles are coupled with the spindles by turning the screw plug, all the spindles can rotate at the same time through the intermediary of the toothed rim, so that a joint adjustment of the clamping jaws takes place. When the cones are disconnected, each spindle can be turned separately and therefore each jaw can be adjusted individually. All these chucks are open primarily to the objection that the relatively very small cone friction clutches must, in the case of central chucking, take up all moments of force caused by the chucking, with the result that overstressing is unavoidable and perfect gripping cannot be obtained.

According to the invention, the screw spindles are rotatable and fixable in the jaws with the aid of collars and screw into rotatable spindle nuts radially shiftable in the chuck body, which nuts can be jointly actuated by a self-locking drive. By this means a chuck is produced in which, in the case of individual adjustment of the jaws, the spindles screw into and out of the nuts in the chuck body without these nuts themselves turning, being prevented by the self-locking drive, the jaws being thereby carried along by the spindle heads. If all the jaws are to be simultaneously adjusted, the spindle heads are locked in the jaw carriers or in the jaws themselves so that the spindles are prevented from turning. The nuts are rotated through the intermediary of the common drive with the result that, according to the direction of rotation, they are screwed out of or into the nuts and the jaws jointly shifted to a corresponding extent. Hereby the devices locking the spindles against turning have merely to take up the relatively low frictional resistances of the spindles in the nuts.

For the joint operation of the spindles, the spindle nuts are preferably provided on their periphery with a worm gearing meshing with worm wheels, the axles of which are in mutual driving connection through the intermediary of bevel gears.

For severally driving the spindles, locking members are provided which, for instance, engage in the collars provided with splining or notch teeth, the locking members being arranged in the jaw bases and fixable by means of screws. On the other hand, other arrangements of locking means are available as well.

An advantage of the invention also consists in that the gears are completely enclosed in the chuck body and consequently protected against the dropping in of chips and the inconvenience these may cause.

An embodiment of the invention is illustrated by way of example in the accompanying drawing, in which:

Fig. 1 shows a section of the chuck taken in axial direction;

Fig. 2 is a rear view of the chuck with partly exposed gearing;

Fig. 3 is a top plan view of a spindle and jaw base, and

Fig. 4 is an end view of the locking device for the spindles.

In a chuck body 1, jaw bases or ;jaw carriers 2 are radially shiftable and carry the jaws or faces. Heads 4 on spindles 5 are rotatable on balls 6 but not axially shiftable. Splines or serrations 9 are provided on the periphery of the spindle heads 4. Similar splines or serrations 7 are provided on the end faces of the locking members 8 directed towards the spindle heads and these members are shiftable relatively to the spindle heads. Screws 10 mounted in the jaw carriers 2 and provided with heads 11, serve for locking the spindle heads.

Each of the spindle heads has a polygonal hole, for example a hollow square for receiving a push-in key. The jaw bases and the jaws can be made in one piece.

The spindles 5 engage in nuts 13 which are rotatable in bores 14 in the chuck body with balls 16 and 18 between the cup ring 15 and the ring nut 17 but are not axially shiftable. The nuts 13 have worm teeth on their external periphery and worms 21 engage in these teeth. The worms are mounted in liner sleeves 19 in the bearings 20 in the chuck body. The individual worms have on their end journals bevel gears 22 which intermesh. One end journal of one of the worms terminates in a square 25 on which a sleeve 24 having a corresponding square bore is slipped. This sleeve is mounted in the chuck body leaving a free hollow square 23 for the introduction of of a push-in key for turning the nut.

The chuck according to the invention operates in the following manner:

If the jaws are to be set separately, the locking device (7, 8, 9) securing the spindles 5 against rotation, is disengaged by means of the screws 10. The spindles can then be turned individually with the aid of a key inserted in the polygonal hole 12 in the spindle heads 4; they screw into and out of the nuts 13 which are prevented from participating in the turning motion by the self-locking action of the worms 21. The jaws are adjusted according to the direction in which the spindles are turned.

If it is desired to simultaneously adjust all the jaws, the heads of the spindles are locked by the locking members 8 so that they cannot turn. One of the worms 21 is then turned with the aid of a plug key inserted in the square hole 23 in the sleeve 24, with the result that all the worms are rotated through the intermediary of the bevel gears 22. The worms turn the nuts 13 through the intermediary of the worm teeth provided on their periphery. All the spindles are thereby screwed into or out of the nuts 13 so that the jaws are adjusted simultaneously.

I claim:

1. A lathe chuck comprising a body defining an axis, jaw members slidable toward and away from the axis, threaded spindles rotatably accommodated by said members but axially fixed with respect thereto and extending therefrom, spindle nut members provided with threaded bores accommodating said spindles for an axial displacement thereof toward and away from the axis, and self-locking drive means coupling said spindle nut members for the rotation thereof.

2. A lathe chuck comprising a body defining an axis, jaw members slidable toward and away from the axis, threaded spindles rotatably accommodated by said members but axially fixed with respect thereto and extending therefrom, spindle nut members provided with threaded bores accommodating said spindles for an axial displacement thereof toward and away from the axis, and self-locking drive means coupling said spindle nut members for the rotation thereof, said body and spindle nut members defining a chamber isolated from said jaw members and accommodating said drive means.

3. A chuck as claimed in claim 2 comprising heads on each of said threaded spindles for the individual adjustment thereof by rotation in said spindle nut members.

4. A chuck as claimed in claim 3 comprising means for locking the heads against rotation.

5. A chuck as claimed in claim 4 wherein said spindle nut members define gears and said drive means comprises worm gears engaging said gears, bevel gears coupling said worm gears, and key means operatively connected to said worm gears for the actuation of said drive means.

References Cited in the file of this patent

UNITED STATES PATENTS

| | | |
|---|---|---|
| 860,781 | Zulinke | July 23, 1907 |
| 2,245,384 | Bullard | June 10, 1941 |

FOREIGN PATENTS

| | | |
|---|---|---|
| 576,925 | Great Britain | Apr. 26, 1946 |